United States Patent
Kim

(10) Patent No.: US 9,893,612 B2
(45) Date of Patent: Feb. 13, 2018

(54) VOLTAGE GENERATION CIRCUIT

(71) Applicant: SK hynix Inc., Icheon-si, Gyeonggi-do (KR)

(72) Inventor: Ki Soo Kim, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 81 days.

(21) Appl. No.: 14/957,976

(22) Filed: Dec. 3, 2015

(65) Prior Publication Data

US 2017/0033690 A1 Feb. 2, 2017

(30) Foreign Application Priority Data

Jul. 27, 2015 (KR) .................. 10-2015-0105892

(51) Int. Cl.
*H02M 3/07* (2006.01)

(52) U.S. Cl.
CPC .................... *H02M 3/07* (2013.01)

(58) Field of Classification Search
CPC .......... H02M 3/07; H02M 3/073; G11C 5/147
See application file for complete search history.

(56) References Cited

U.S. PATENT DOCUMENTS

| | | | | |
|---|---|---|---|---|
| 5,963,102 A | * | 10/1999 | Pang | H03K 3/0315 331/177 R |
| 2011/0156805 A1 | * | 6/2011 | Kwon | H02M 1/36 327/536 |

FOREIGN PATENT DOCUMENTS

KR 1020000050743 A 8/2000

* cited by examiner

*Primary Examiner* — Henry Lee, III
(74) *Attorney, Agent, or Firm* — William Park & Associates Ltd.

(57) ABSTRACT

A voltage generation circuit includes a voltage detection unit configured to detect a voltage level of an internal voltage and generate a detection signal, a first voltage control unit configured to be applied with a driving voltage and generate a voltage control signal in response to the detection signal, a voltage generation unit configured to generate the internal voltage in response to the voltage control signal, and a second voltage control unit configured to change a voltage level of the driving voltage in response to a voltage generation enable signal and the detection signal.

17 Claims, 8 Drawing Sheets

VOLTAGE GENERATION CIRCUIT

CROSS-REFERENCES TO RELATED APPLICATION

The present application claims priority under 35 U.S.C. § 119(a) to Korean application number 10-2015-0105892 filed on Jul. 27, 2015, in the Korean Intellectual Property Office, which is incorporated herein by reference in its entirety.

BACKGROUND

1. Technical Field

Various embodiments generally relate to a semiconductor integrated circuit, and more particularly to a voltage generation circuit.

2. Related Art

A semiconductor integrated circuit operates on power supply voltages. The semiconductor integrated circuit may generate operating voltages that are used in various operations thereof.

Recently, various types of voltage generation circuits are being developed to generate a voltage with a stable voltage level.

SUMMARY

In an embodiment, a voltage generation circuit may include: a voltage detection unit configured to detect a voltage level of an internal voltage and generate a detection signal; a first voltage control unit configured to be applied with a driving voltage and generate a voltage control signal in response to the detection signal; a voltage generation unit configured to generate the internal voltage in response to the voltage control signal; and a second voltage control unit configured to change a voltage level of the driving voltage in response to a voltage generation enable signal and the detection signal.

In an embodiment, a voltage generation circuit suitable for retaining a voltage level of an internal voltage at a predetermined voltage level when a voltage generation enable signal is enabled may include: a voltage detection unit configured to enable a detection signal when the voltage level of the internal voltage is lower than the predetermined voltage level; a first voltage control unit configured to enable a voltage control signal to a voltage level of a driving voltage when the detection signal which is enabled is inputted; a voltage generation unit configured to determine an increment of the internal voltage according to a voltage level of the enabled voltage control signal, and raise the voltage level of the internal voltage; and a second voltage control unit configured to generate the driving voltage which has a lower voltage level during a period in which the voltage generation enable signal is enabled and the detection signal is enabled first than after the detection signal enabled first is disabled.

In an embodiment, a voltage generation circuit may include: a pumping voltage detection unit configured to detect a voltage level of a pumping voltage and generate a detection signal; an oscillator configured to generate a voltage control signal which cyclically transitions to a voltage level of a driving voltage, in response to the detection signal; a pumping unit configured to generate the pumping voltage in response to the voltage control signal which cyclically transitions; and a driving voltage providing unit configured to change the voltage level of the driving voltage in response to a voltage generation enable signal and the detection signal.

In an embodiment, a voltage generation circuit suitable for retaining a voltage level of a pumping voltage at a predetermined voltage level when a voltage generation enable signal is enabled may include: a pumping voltage detection unit configured to enable a detection signal when the voltage level of the pumping voltage is lower than the predetermined voltage level; an oscillator configured to generate a voltage control signal which cyclically transitions to a voltage level of a driving voltage, when the detection signal is enabled; a pumping unit configured to determine a voltage level increment of the pumping voltage according to the voltage level of the driving voltage, and raise the voltage level of the pumping voltage; and a driving voltage providing unit configured to generate the driving voltage which has a lower voltage level during a period in which the voltage generation enable signal is enabled and the detection signal is enabled first than after the detection signal enabled first is disabled.

DETAILED DESCRIPTION

Hereinafter, a voltage generation circuit will be described below with reference to the accompanying drawings through various examples of embodiments.

Figure 1:
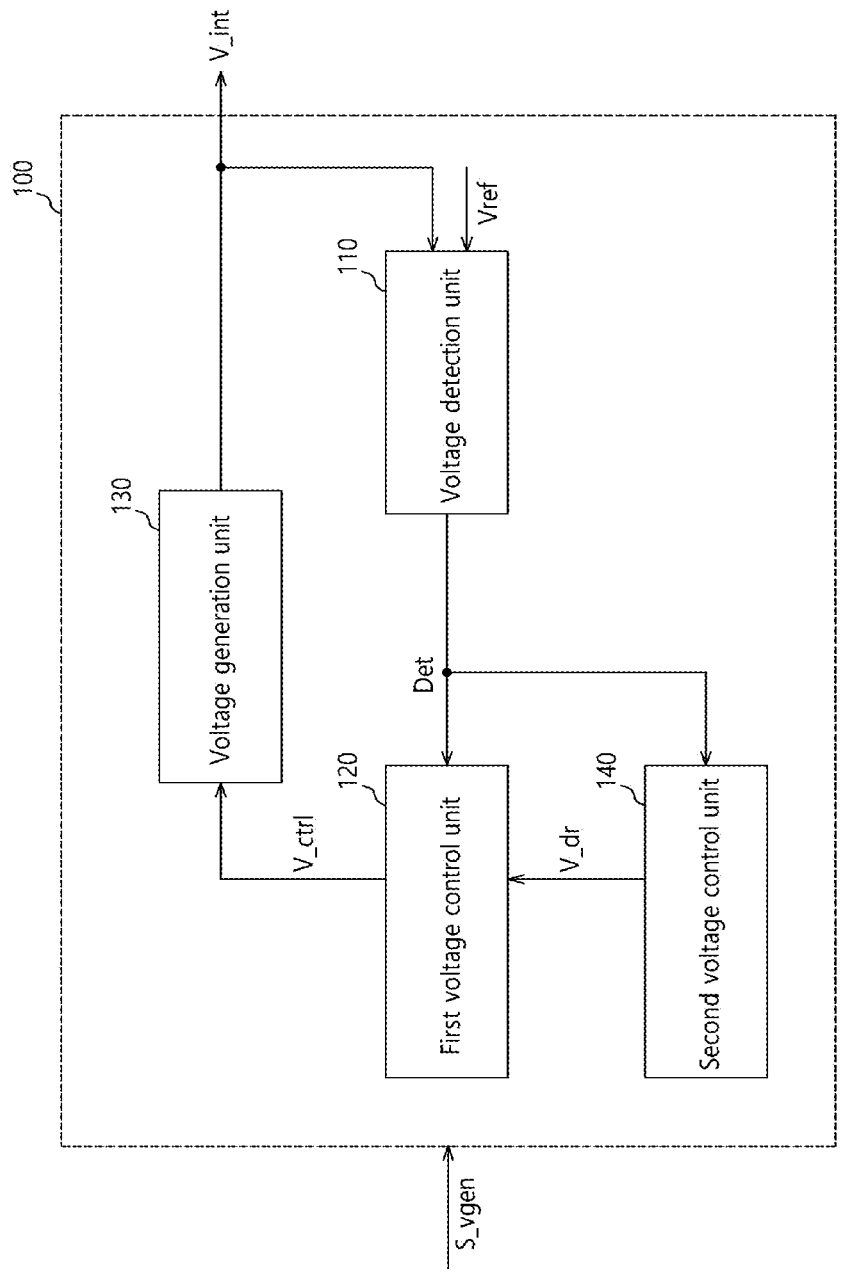
FIG. 1 is a configuration diagram illustrating a voltage generation circuit in accordance with an embodiment.

As shown in FIG. 1, a voltage generation circuit 100 in accordance with an embodiment may include a voltage detection unit 110, a first voltage control unit 120, a voltage generation unit 130, and a second voltage control unit 140.

The voltage generation circuit 100 generates an internal voltage V_int in response to a voltage generation enable signal S_vgen. For example, the voltage generation circuit 100 may maintain the internal voltage V_int at a predetermined voltage level when the voltage generation enable signal S_vgen is in an active state. The voltage generation enable signal S_vgen may activate one or more of the voltage detection unit 110, the first voltage control unit 120, the voltage generation unit 130, and the second voltage control unit 140, which form the voltage generation circuit 100. The voltage generation enable signal S_vgen may be inputted to each of the components forming the voltage generation circuit 100.

The voltage detection unit 110 generates a detection signal Det in response to the voltage level of the internal voltage V_int. For example, the voltage detection unit 110 enables the detection signal Det when the voltage level of the internal voltage V_int is lower than the voltage level of a predetermined voltage, whereas the voltage detection unit 110 disables the detection signal Det when the voltage level of the internal voltage V_int is higher than the voltage level of the predetermined voltage. In an embodiment, the voltage detection unit 110 enables the detection signal Det when the voltage level of the internal voltage V_int is lower than the voltage level of a reference voltage Vref, whereas the voltage detection unit 110 disables the detection signal Det when the voltage level of the internal voltage V_int is higher than the voltage level of the reference voltage Vref.

The first voltage control unit 120 generates a voltage control signal V_ctrl in response to a driving voltage V_dr and the detection signal Det. For example, the first voltage control unit 120 outputs the voltage control signal V_ctrl by driving the detection signal Det with the driving voltage V_dr. In detail, the first voltage control unit 120 enables the voltage control signal V_ctrl when the detection signal Det is enabled, and the enabled voltage control signal V_ct may have the same voltage level as the driving voltage V_dr.

The voltage generation unit 130 generates the internal voltage V_int in response to the voltage control signal V_ctrl. For example, the voltage generation unit 130 raises the voltage level of the internal voltage V_int when the voltage control signal V_ctrl is enabled. The voltage generation unit 130 increases the voltage level increment of the internal voltage V_int as the voltage level of the enabled voltage control signal V_ctrl increases.

The second voltage control unit 140 generates the driving voltage V_dr in response to the detection signal Det and the voltage generation enable signal S_vgen. The driving voltage V_dr generated when the voltage generation enable signal S_vgen and the detection signal Det are simultaneously enabled may have a lower voltage level than when the detection signal Det is enabled with the voltage generation enable signal S_vgen enabled. For example, the second voltage control unit 140 generates a first voltage as the driving voltage V_dr during a first enable period of the detection signal Det after the voltage generation enable signal S_vgen is enabled, and generates a second voltage, which is higher than the first voltage, as the driving voltage V_dr during the second enable period of the detection signal Det.

Figure 2:
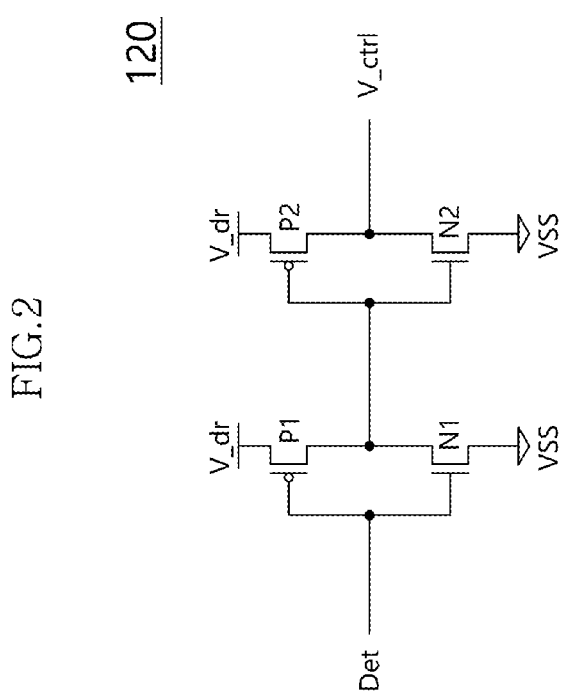
FIG. 2 is a configuration diagram illustrating an example of a first voltage control unit shown in FIG. 1.

As shown in FIG. 2, the first voltage control unit 120 may include first to fourth transistors P1, N1, P2 and N2. The first transistor P1 has a gate, which is inputted with the detection signal Det, and a source, which is applied with the driving voltage V_dr. The second transistor N1 has a gate, which is inputted with the detection signal Det, a drain coupled to the drain of the first transistor P1, and a source coupled to a ground terminal VSS. The third transistor P2 has a gate coupled to the drains of the first and second transistors P1 and N1, and a source, which is applied with the driving voltage V_dr. The fourth transistor N2 has a gate coupled to the drains of the first and second transistors P1 and N1, a drain coupled to the drain of the third transistor P2, and a source coupled to the ground terminal VSS. The voltage control signal V_ctrl is outputted from a node coupled to the drains of the third and fourth transistors P2 and N2.

The first voltage control unit 120 in accordance with an embodiment generates the enabled voltage control signal V_ctrl, which has the voltage level of the driving voltage V_dr, in response to the enabled detection signal Det, which has a high level. The first voltage control unit 120 generates the disabled voltage control signal V_ctrl, which has the voltage level of the ground terminal VSS, in response to the disabled detection signal Det, which has a low level.

The first voltage control unit 120 may include a driver for generating the voltage control signal V_ctrl by driving the detection signal Det with the voltage level of the driving voltage V_dr.

Figure 3:
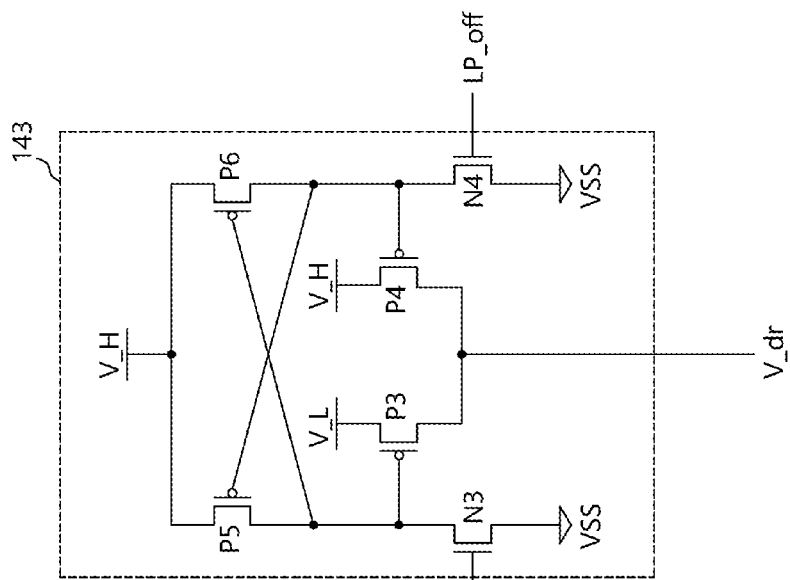
FIG. 3 is a configuration diagram illustrating an example of a second voltage control unit shown in FIG. 1.

As shown in FIG. 3, the second voltage control unit 140 may include a driving voltage selection section 141, a voltage dropping section 142, and a driving voltage output section 143.

The driving voltage selection section 141 generates a first voltage select signal LP_on and a second voltage select signal LP_off in response to the voltage generation enable signal S_vgen and the detection signal Det. For example, when the voltage generation enable signal S_vgen is enabled, the driving voltage selection section 141 enables the first voltage select signal LP_on and disables the second voltage select signal LP_off until the detection signal Det becomes disabled. The driving voltage selection section 141 disables the first voltage select signal LP_on and enables the second voltage select signal LP_off when the detection signal Det is disabled.

The driving voltage selection section 141 may include a flip-flop FF1. The flip-flop FF1 has a signal input terminal, which is inputted with a first voltage V_H, a clock input terminal, which is inputted with the voltage generation enable signal S_vgen, a reset terminal, which is inputted with the detection signal Det, an output terminal, which outputs the first voltage select signal LP_on, and an output terminal bar, which outputs the second voltage select signal LP_off. The phases of the first voltage select signal LP_on and the second voltage select signal LP_off are opposite to each other.

The operation of the driving voltage selection section 141 in accordance with an embodiment will be described below in detail.

If the voltage generation enable signal S_vgen inputted to the clock input terminal of the flip-flop FF1 is enabled when the detection signal Det inputted to the reset terminal of the flip-flop FF1 is in an active state, the first voltage V_H inputted to the signal input terminal of the flip-flop FF1 is outputted as the level of the first voltage select signal LP_on, and the second voltage select signal LP_off is outputted at the voltage level of the ground terminal VSS. The first voltage select signal LP_on outputted at the voltage level of the first voltage V_H may mean that the first voltage select signal LP_on is enabled, and the second voltage select signal LP_off outputted at the voltage level of the ground terminal VSS may mean that the second voltage select signal LP_off is disabled.

If the detection signal Det inputted to the reset terminal of the flip-flop FF1 is disabled, the first voltage select signal LP_on is disabled to the voltage level of the ground terminal VSS, and the second voltage select signal LP_off is enabled to the voltage level of the first voltage V_H.

In the voltage dropping section 142, the first voltage V_H drops to a second voltage V_L, which has a voltage level lower than the voltage level of the first voltage V_H.

The voltage dropping section 142 may include a first resistor R1 and a second resistor R2. The first resistor R1 is coupled to a node that provides the first voltage V_H at one end thereof and coupled to the second resistor R2 at the other end thereof. The second resistor R2 is coupled to a node that provides the ground terminal VSS at one end thereof and coupled to the first resistor R1 at the other end thereof. The second voltage V_L is outputted from a node coupled to the first and second resistors R1 and R2. Therefore, the voltage level of the second voltage V_L may be controlled according to the resistance ratio of the first and second resistors R1 and R2.

The driving voltage output section 143 outputs one of the first and second voltages V_H and V_L as the driving voltage V_dr in response to the first and second voltage select signals LP_on and LP_off. For example, the driving voltage output section 143 outputs the second voltage V_L as the driving voltage V_dr when the first voltage select signal LP_on is enabled and the second voltage select signal LP_off is disabled. The driving voltage output section 143 outputs the first voltage V_H as the driving voltage V_dr when the first voltage select signal LP_on is disabled and the second voltage select signal LP_off is enabled.

The driving voltage output section 143 may include fifth to tenth transistors N3, N4, P3, P4, P5, and P6. The fifth transistor N3 has a gate, which is inputted with the first voltage select signal LP_on, and a source coupled to the ground terminal VSS. The sixth transistor N4 has a gate, which is inputted with the second voltage select signal LP_off, and a source coupled to the ground terminal VSS. The seventh transistor P3 has a gate coupled to the drain of the fifth transistor N3, and a source, which is applied with the second voltage V_L. The eighth transistor P4 has a gate coupled to the drain of the sixth transistor N4, and a source, which is applied with the first voltage V_H. The driving voltage V_dr is outputted from a node coupled to the drains of the seventh and eighth transistors P3 and P4. The ninth transistor P5 has a gate coupled to the gate of the eighth transistor P4, a source, which is applied with the first voltage V_H, and a drain coupled to the gate of the seventh transistor P3. The tenth transistor P6 has a gate coupled to the gate of the seventh transistor P3, a source, which is applied with the first voltage V_H, and a drain coupled to the gate of the eighth transistor P4.

The operation of the driving voltage output section 143 in accordance with an embodiment will be described below.

An operation of outputting the second voltage V_L as the driving voltage V_dr will be described below.

In this operation, the first voltage select signal LP_on is enabled, and the second voltage select signal LP_off is disabled.

The fifth transistor N3 is turned on, and the sixth transistor N4 is turned off.

If the fifth transistor N3 is turned on, the gate voltage of the seventh transistor P3 decreases, and the seventh transistor P3 is turned on. As the gate voltage of the tenth transistor P6 decreases due to the turned-on fifth transistor N3 and thus the gate voltage of the eighth transistor P4 increases, the eighth transistor P4 is turned off.

Accordingly, by the turned-on seventh transistor P3 and the turned-off eighth transistor P4, the second voltage V_L is outputted as the driving voltage V_dr.

An operation of outputting the first voltage V_H as the driving voltage V_dr will be described below.

In this operation, the first voltage select signal LP_on is disabled, and the second voltage select signal LP_off is enabled.

The fifth transistor N3 is turned off, and the sixth transistor N4 is turned on.

If the sixth transistor N4 is turned on, as the gate voltage of the eighth transistor P4 decreases, the eighth transistor P4 is turned on. As the gate voltage of the ninth transistor P5 decreases due to the turned-on sixth transistor N4 and thus the gate voltage of the seventh transistor P3 increases, the seventh transistor P3 is turned off.

Accordingly, by the turned-off seventh transistor P3 and the turned-on eighth transistor P4, the first voltage V_H is outputted as the driving voltage V_dr.

The operation of the second voltage control unit 140 in accordance with an embodiment may be summarized as follows.

The driving voltage selection section 141 enables the first voltage select signal LP_on and disables the second voltage select signal LP_off when the voltage generation enable signal S_vgen and the detection signal Det are simultaneously enabled. That is to say, when the voltage generation enable signal S_vgen and the detection signal Det are enabled, the driving voltage selection section 141 enables the first voltage select signal LP_on and disables the second voltage select signal LP_off until the detection signal Det becomes disabled.

If the first voltage select signal LP_on is enabled and the second voltage select signal LP_off is disabled, the driving voltage output section 143 outputs the second voltage V_L having the voltage level lower than the first voltage V_H as the driving voltage V_dr.

The driving voltage selection section 141 disables the first voltage select signal LP_on and enables the second voltage select signal LP_off when the detection signal Det is disabled.

If the first voltage select signal LP_on is disabled and the second voltage select signal LP_off is enabled, the driving voltage output section 143 outputs the first voltage V_H having the voltage level higher than the second voltage V_L as the driving voltage V_dr.

The operation of the voltage generation circuit 100 in accordance with the embodiment will be described below.

The voltage generation enable signal S_vgen is enabled and activates the voltage generation circuit 100.

As the voltage generation circuit 100 is activated, the voltage detection unit 110, the first voltage control unit 120, the voltage generation unit 130, and the second voltage control unit 140 are activated.

The voltage detection unit 110 enables the detection signal Det when the voltage level of the internal voltage V_int is lower than the voltage level of the predetermined voltage, and disables the detection signal Det when the voltage level of the internal voltage V_int is higher than the voltage level of the predetermined voltage.

The first voltage control unit 120 outputs the voltage control signal V_ctrl by driving the detection signal Det with the voltage level of the driving voltage V_dr. This will be described in detail as follows. The first voltage control unit 120 outputs the enabled detection signal Det as the voltage control signal V_ctrl enabled to the voltage level of the first voltage V_H when the first voltage V_H is outputted as the driving voltage V_dr. The first voltage control unit 120 outputs the enabled detection signal Det in response to the enabled voltage control signal V_ctrl, which has the voltage level of the second voltage V_L, when the second voltage V_L is outputted as the driving voltage V_dr. Further, the first voltage control unit 120 outputs the disabled voltage control signal V_ctrl, which has the voltage level of the ground terminal VSS, when the detection signal Det is disabled. The voltage level of the first voltage V_H is higher than the voltage level of the second voltage V_L.

The voltage generation unit 130 generates the internal voltage V_int in response to the voltage control signal V_ctrl. For example, in the voltage generation unit 130, the voltage level of the internal voltage V_int increases when the voltage control signal V_ctrl is enabled. The voltage level increment of the internal voltage V_int is determined according to the voltage level of the enabled voltage control signal V_ctrl. In other words, in the voltage generation unit 130, the voltage level of the internal voltage V_int increases more quickly when the first voltage V_H is outputted as the driving voltage V_dr than when the second voltage V_L is outputted as the driving voltage V_dr.

The second voltage control unit 140 determines the voltage level of the driving voltage V_dr in response to the voltage generation enable signal S_vgen and the detection signal Det. For example, the second voltage control unit 140 outputs the second voltage V_L as the driving voltage V_dr when the detection signal Det and the voltage generation enable signal S_vgen are simultaneously enabled. The second voltage control unit 140 outputs the second voltage V_L as the driving voltage V_dr until the detection signal Det becomes disabled. The second voltage control unit 140 outputs the first voltage V_H as the driving voltage V_dr when the detection signal Det becomes enabled again in the situation where the voltage generation enable signal S_vgen is enabled.

The second voltage V_L is outputted as the driving voltage V_dr during the period in which the voltage generation enable signal S_vgen is enabled and the detection signal Det is enabled for the first time, and the first voltage V_H is outputted as the driving voltage V_dr during the enable period of the detection signal Det from when the detection signal Det is enabled for the second time.

Figure 4:
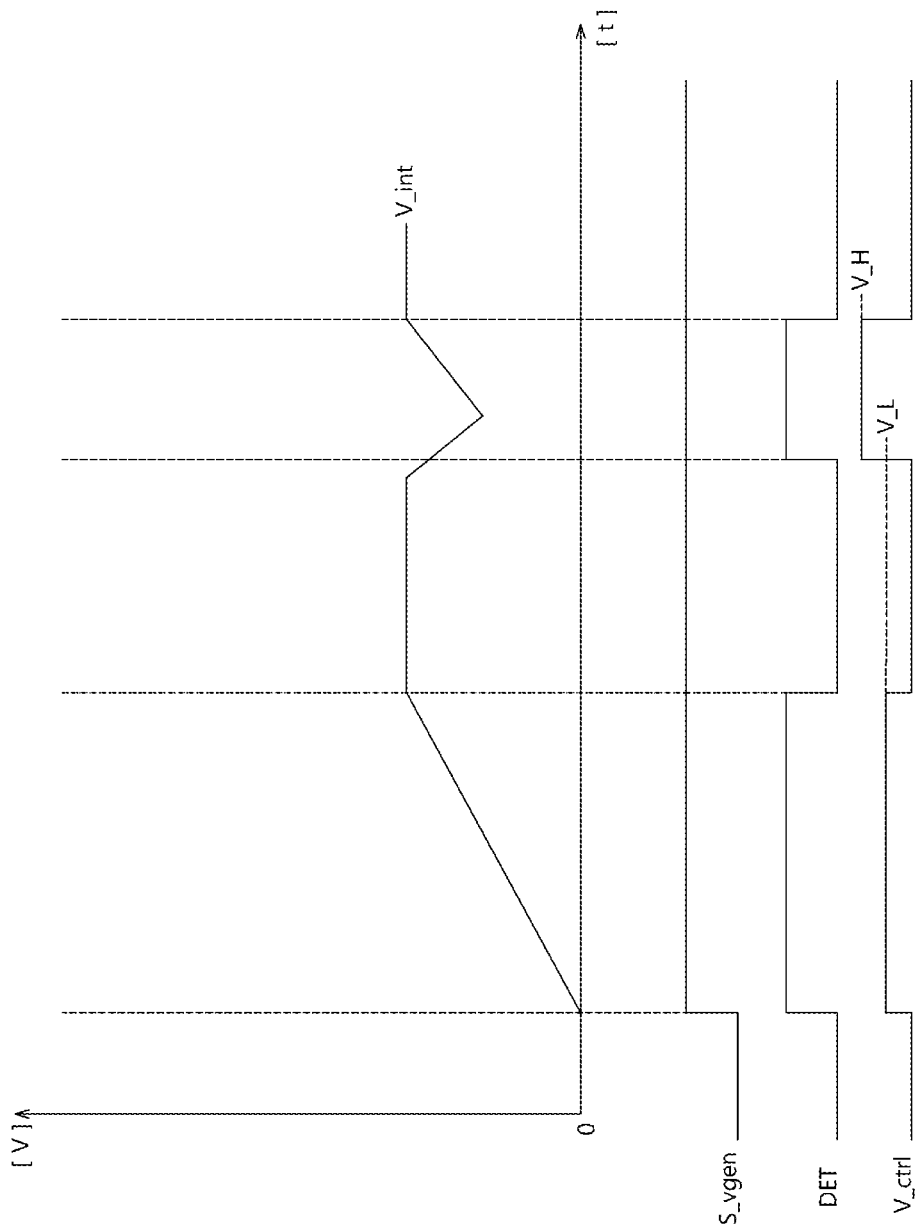
FIG. 4 is a graph provided to assist in explaining an operation of the voltage generation circuit in accordance with an embodiment.

As shown in FIG. 4, in the voltage generation circuit 100 in accordance with an embodiment, if the voltage generation enable signal S_vgen is enabled and the voltage generation circuit 100 is activated, the enabled voltage control signal V_ctrl, which has the voltage level of the second voltage V_L, is generated during the first enable period of the detection signal Det and allow the voltage level of the internal voltage V_int to increase. Thereafter, the enabled voltage control signal V_ctrl, which has the voltage level of the first voltage V_H, is generated from the second enable period of the detection signal Det and allow the voltage level of the internal voltage V_int to increase.

As a consequence, in the voltage generation circuit 100 in accordance with an embodiment, the voltage level increment of the internal voltage V_int during the period when the detection signal Det is enabled for the first time is a situation where the voltage generation enable signal S_vgen is enabled is smaller than the voltage level increment of the internal voltage V_int from when the detection signal Det is enabled for the second time.

Figure 5:
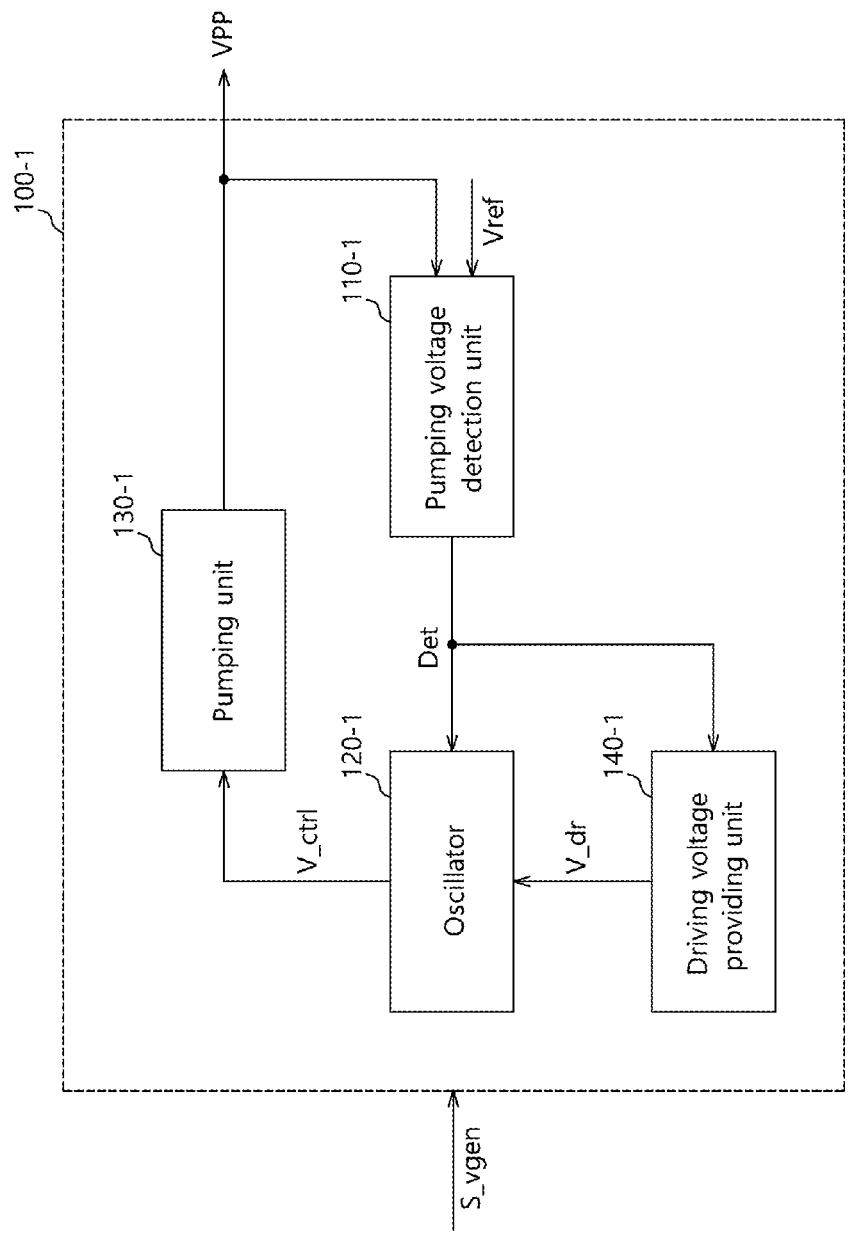
FIG. 5 is a configuration diagram illustrating a voltage generation circuit in accordance with an embodiment.

As shown in FIG. 5, a voltage generation circuit 100-1 in accordance with an embodiment may include a pumping voltage detection unit 110-1, an oscillator 120-1, a pumping unit 130-1, and a driving voltage providing unit 140-1.

The voltage generation circuit 100-1 generates a pumping voltage VPP in response to a voltage generation enable signal S_vgen. For example, the voltage generation circuit 100-1 may maintain the pumping voltage VPP at a predetermined voltage level when the voltage generation enable signal S_vgen is in an active state. The voltage generation enable signal S_vgen may activate one or more of the pumping voltage detection unit 110-1, the oscillator 120-1, the pumping unit 130-1, and the driving voltage providing unit 140-1, which form the voltage generation circuit 100-1. The voltage generation enable signal S_vgen may be inputted to each of the components forming the voltage generation circuit 100-1. Since the pumping voltage VPP is a voltage generated internally in a semiconductor integrated circuit, it may be referred to as an internal voltage. Also, the voltage generation circuit 100-1 shown in FIG. 5 may be an example of the voltage generation circuit 100 shown in FIG. 1. The pumping voltage detection unit 110-1, the oscillator 120-1, the pumping unit 130-1, and the driving voltage providing unit 140-1 shown in FIG. 5 may be examples of the voltage detection unit 110, the first voltage control unit 120, the voltage generation unit 130, and the second voltage control unit 140 shown in FIG. 1, respectively.

The pumping voltage detection unit 110-1 generates a detection signal Det in response to the voltage level of the pumping voltage VPP. For example, the pumping voltage detection unit 110-1 enables the detection signal Det when the voltage level of the pumping voltage VPP is lower than the voltage level of a predetermined voltage, whereas the pumping voltage detection unit 110-1 disables the detection signal Det when the voltage level of the pumping voltage VPP is higher than the voltage level of the predetermined voltage. In an embodiment, the pumping voltage detection unit 110-1 enables the detection signal Det when the voltage level of the pumping voltage VPP is lower than the voltage level of a reference voltage Vref, whereas the pumping voltage detection unit 110-1 disables the detection signal Det when the voltage level of the pumping voltage VPP is higher than the voltage level of the reference voltage Vref.

The oscillator 120-1 generates a voltage control signal V_ctrl in response to a driving voltage V_dr and the detection signal Det. For example, the oscillator 120-1 outputs an oscillator signal, which cyclically transitions to the voltage level of the driving voltage V_dr, as the voltage control signal V_ctrl, when the detection signal Det is enabled. The oscillator 120-1 generates the voltage control signal V_ctrl, which is fixed to a specified level, for example, the voltage level of a ground terminal VSS, when the detection signal Det is disabled.

The pumping unit 130-1 generates the pumping voltage VPP in response to the voltage control signal V_ctrl. For example, the pumping unit 130-1 raises the voltage level of the pumping voltage VPP by performing a pumping operation when the voltage control signal V_ctrl is a signal which cyclically transitions. The pumping unit 130-1 increases the voltage level increment of the pumping voltage VPP as the voltage level of the voltage control signal V_ctrl which cyclically transitions to the voltage level of the driving voltage V_dr increases.

The driving voltage providing unit 140-1 generates the driving voltage V_dr in response to the detection signal Det and the voltage generation enable signal S_vgen. The driving voltage V_dr generated when the voltage generation enable signal S_vgen and the detection signal Det are simultaneously enabled may have a lower voltage level than when the detection signal Det is enabled with the voltage generation enable signal S_vgen enabled. For example, the driving voltage providing unit 140-1 generates a first voltage as the driving voltage V_dr during a first enable period of the detection signal Det after the voltage generation enable signal S_vgen is enabled, and generates a second voltage, which is higher than the first voltage, as the driving voltage V_dr during the second enable period of the detection signal Det.

Figure 6:
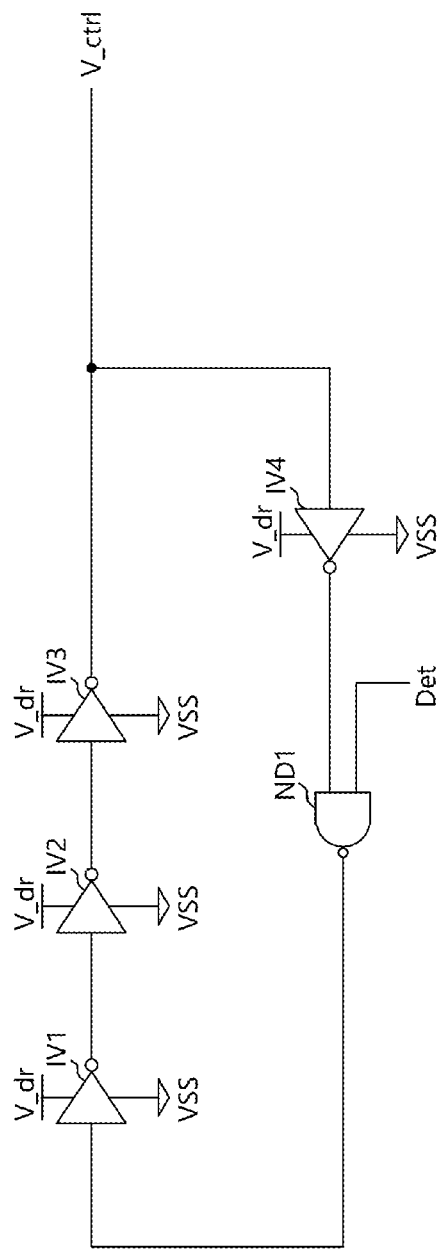
FIG. 6 is a configuration diagram illustrating an example of an oscillator shown in FIG. 5.

As shown in FIG. 6, the oscillator 120-1 includes first to fourth inverters IV1, IV2, IV3, and IV4 and a NAND gate ND1. The first inverter IV1 is inputted with the output signal of the NAND gate ND1. The second inverter IV2 is inputted with the output signal of the first inverter IV1. The third inverter IV3 is inputted with the output signal of the second inverter IV2. The fourth inverter IV4 is inputted with the output signal of the third inverter IV3. The NAND gate ND1 is inputted with the detection signal Det and the output signal of the fourth inverter IV4. The first to fourth inverters IV1, IV2, IV3 and IV4 operate by being applied with the driving voltage V_dr and a ground voltage VSS, and the output signal of the third inverter IV3 is outputted as the voltage control signal V_ctrl.

Since the NAND gate ND1 inverts the output signal of the fourth inverter IV4 and outputs a resultant signal to the first inverter IV1 in response to an enabled detection signal Det, which has a high level, the oscillator 120-1 generates the voltage control signal V_ctrl which cyclically transitions. Since the first to fourth inverters IV1, IV2, IV3, and IV4, which form the oscillator 120-1, are applied with the driving voltage V_dr and the ground voltage VSS, the voltage control signal V_ctrl is generated as a signal cyclically transitioning to the voltage levels of the driving voltage V_dr and the ground voltage VSS. The NAND gate ND1 outputs a signal, which is fixed to a specified level (e.g., a high level) regardless of the output signal of the fourth inverter IV4 in response to a disabled detection signal Det, which has a low level. Accordingly, if the detection signal Det is disabled, the voltage control signal V_ctrl is also fixed to a specified level (e.g., the voltage level of the ground voltage VSS).

Figure 7:
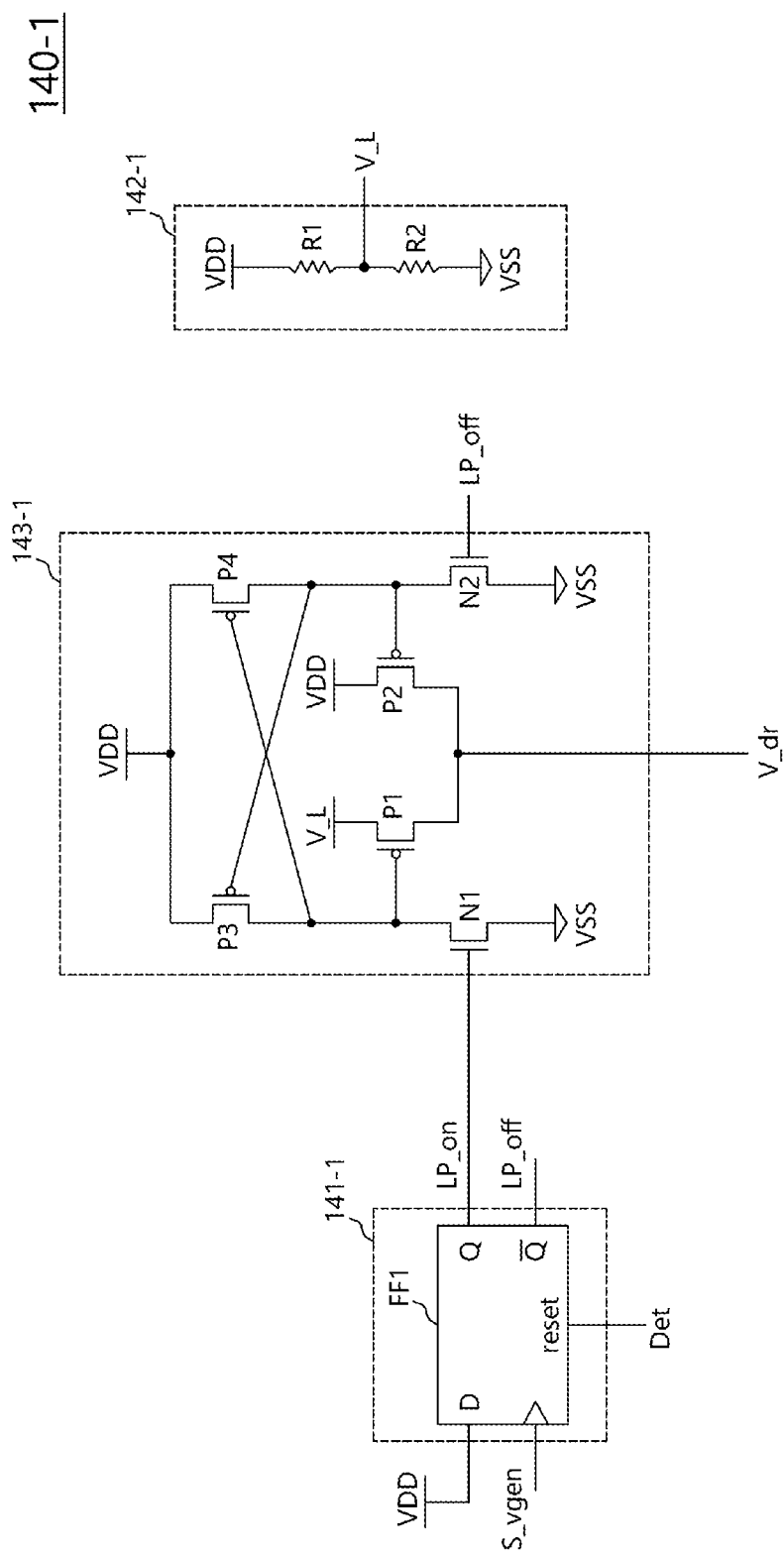
FIG. 7 is a configuration diagram illustrating an example of a driving voltage providing unit shown in FIG. 5.

As shown in FIG. 7, the driving voltage providing unit 140-1 may include a driving voltage selection section 141-1, a voltage dropping section 142-1, and a driving voltage output section 143-1.

The driving voltage selection section 141-1 generates a first voltage select signal LP_on and a second voltage select signal LP_off in response to the voltage generation enable signal S_vgen and the detection signal Det. For example, when the voltage generation enable signal S_vgen is enabled, the driving voltage selection section 141-1 enables the first voltage select signal LP_on and disables the second voltage select signal LP_off until the detection signal Det becomes disabled. The driving voltage selection section 141-1 disables the first voltage select signal LP_on and enables the second voltage select signal LP_off when the detection signal Det is disabled.

The driving voltage selection section 141-1 may include a flip-flop FF1. The flip-flop FF1 has a signal input terminal, which is inputted with an external voltage VDD, a clock input terminal, which is inputted with the voltage generation enable signal S_vgen, a reset terminal, which is inputted with the detection signal Det, an output terminal, which outputs the first voltage select signal LP_on, and an output terminal bar, which outputs the second voltage select signal LP_off. The phases of the first voltage select signal LP_on and the second voltage select signal LP_off are opposite to each other.

The operation of the driving voltage selection section 141-1 in accordance with an embodiment will be described below in detail.

If the voltage generation enable signal S_vgen inputted to is the clock input terminal of the flip-flop FF1 is enabled when the detection signal Det inputted to the reset terminal of the flip-flop FF1 is in an active state, the external voltage VDD inputted to the signal input terminal of the flip-flop FF1 is outputted as the level of the first voltage select signal LP_on, and the second voltage select signal LP_off is outputted at the voltage level of the ground terminal VSS. The first voltage select signal LP_on outputted at the voltage level of the external voltage VDD may means that the first voltage select signal LP_on is enabled, and the second voltage select signal LP_off outputted at the voltage level of the ground terminal VSS may mean that the second voltage select signal LP_off is disabled.

If the detection signal Det inputted to the reset terminal of the flip-flop FF1 is disabled, the first voltage select signal LP_on is disabled to the voltage level of the ground terminal VSS, and the second voltage select signal LP_off is enabled to the voltage level of the external voltage VDD.

In the voltage dropping section 142-1, the external voltage VDD drops to a dropped voltage V_L, which has a voltage level lower than the voltage level of the external voltage VDD.

The voltage dropping section 142-1 may include a first resistor R1 and a second resistor R2. The first resistor R1 is coupled to a node that provides the external voltage VDD at one end thereof and coupled to the second resistor R2 at the other end thereof. The second resistor R2 is coupled to a node that provides the ground terminal VSS at one end thereof and coupled to the first resistor R1 at the other end thereof. The dropped voltage V_L is outputted from a node coupled to the first and second resistors R1 and R2. Therefore, the voltage level of the dropped voltage V_L may be controlled according to the resistance ratio of the first and second resistors R1 and R2.

The driving voltage output section 143-1 outputs one of the external voltage VDD and the dropped voltage V_L as the driving voltage V_dr in response to the first and second voltage select signals LP_on and LP_off. For example, the driving voltage output section 143-1 outputs the dropped voltage V_L as the driving voltage V_dr when the first voltage select signal LP_on is enabled and the second voltage select signal LP_off is disabled. The driving voltage output section 143-1 outputs the external voltage VDD as the driving voltage V_dr when the first voltage select signal LP_on is disabled and the second voltage select signal LP_off is enabled.

The driving voltage output section 143-1 may include first to sixth transistors N1, N2, P1, P2, P3, and P4. The first transistor N1 has a gate which is inputted with the first voltage select signal LP_on and a source coupled to the ground terminal VSS. The second transistor N2 has a gate which is inputted with the second voltage select signal LP_off and a source coupled to the ground terminal VSS. The third transistor P1 has a gate coupled to the drain of the first transistor N1, and a source, which is applied with the dropped voltage V_L. The fourth transistor P2 has a gate coupled to the drain of the second transistor N2, and a source, which is applied with the external voltage VDD. The driving voltage V_dr is outputted from a node coupled to the drains of the third and fourth transistors P1 and P2. The fifth transistor P3 has a gate coupled to the gate of the fourth transistor P2, a source, which is applied with the external voltage VDD, and a drain coupled to the gate of the third transistor P1. The sixth transistor P4 has a gate coupled to the gate of the third transistor P1, a source, which is applied with the external voltage VDD, and a drain coupled to the gate of the fourth transistor P2.

The operation of the driving voltage output section 143-1 in accordance with an embodiment will be described below.

An operation of outputting the dropped voltage V_L as the driving voltage V_dr will be described below.

In this operation, the first voltage select signal LP_on is enabled, and the second voltage select signal LP_off is disabled.

The first transistor N1 is turned on, and the second transistor N2 is turned off.

If the first transistor N1 is turned on, the gate voltage of the third transistor P1 decreases, and the third transistor P1 is turned on. As the gate voltage of the sixth transistor P4 decreases due to the turned-on first transistor N1 and thus the gate voltage of the fourth transistor P2 increases, the fourth transistor P2 is turned off.

Accordingly, by the turned-on third transistor P1 and the turned-off fourth transistor P2, the dropped voltage V_L is outputted as the driving voltage V_dr.

An operation of outputting the external voltage VDD as the driving voltage V_dr will be described below.

In this operation, the first voltage select signal LP_on is disabled, and the second voltage select signal LP_off is enabled.

The first transistor N1 is turned off, and the second transistor N2 is turned on.

If the second transistor N2 is turned on, as the gate voltage of the fourth transistor P2 decreases, the fourth transistor P2 is turned on. As the gate voltage of the fifth transistor P3 decreases due to the turned-on second transistor N2 and thus the gate voltage of the third transistor P1 increases, the third transistor P1 is turned off.

Accordingly, by the turned-off third transistor P1 and the turned-on fourth transistor P2, the external voltage VDD is outputted as the driving voltage V_dr.

The operation of the driving voltage providing unit 140-1 in accordance with an embodiment will be described below.

The driving voltage selection section 141-1 enables the first voltage select signal LP_on and disables the second voltage select signal LP_off, when the voltage generation enable signal S_vgen and the detection signal Det are simultaneously enabled. That is to say, when the voltage generation enable signal S_vgen is enabled with the detection signal Det enabled, the driving voltage selection section 141-1 enables the first voltage select signal LP_on and disables the second voltage select signal LP_off until the detection signal Det becomes disabled.

If the first voltage select signal LP_on is enabled and the second voltage select signal LP_off is disabled, the driving voltage output section 143-1 outputs the dropped voltage V_L having the voltage level lower than the external voltage VDD as the driving voltage V_dr.

The driving voltage selection section 141-1 disables the first voltage select signal LP_on and enables the second voltage select signal LP_off when the detection signal Det is disabled.

If the first voltage select signal LP_on is disabled and the second voltage select signal LP_off is enabled, the driving voltage output section 143-1 outputs the external voltage VDD having the voltage level higher than the dropped voltage V_L as the driving voltage V_dr.

The operation of the voltage generation circuit 100-1 in accordance with the embodiment will be described below.

The voltage generation enable signal S_vgen is enabled and activates the voltage generation circuit 100-1.

As the voltage generation circuit 100-1 is activated, the pumping voltage detection unit 110-1, the oscillator 120-1, the pumping unit 130-1, and the driving voltage providing unit 140-1 are activated.

The pumping voltage detection unit 110-1 enables the detection signal Det when the voltage level of the pumping voltage VPP is lower than the voltage level of the predetermined voltage, and disables the detection signal Det when the voltage level of the pumping voltage VPP is higher than the voltage level of the predetermined voltage.

The oscillator 120-1 generates the voltage control signal V_ctrl which cyclically transitions to the voltage levels of the driving voltage V_dr and the ground voltage VSS, when the detection signal Det is enabled. The oscillator 120-1 fixes the voltage control signal V_ctrl to the voltage level of the ground voltage VSS when the detection signal Det is disabled.

This will be described in detail as follows. The oscillator 120-1 generates the voltage control signal V_ctrl, which cyclically transitions to the voltage levels of the external voltage VDD, and the ground voltage VSS when the detection signal Det is enabled and the external voltage VDD is outputted as the driving voltage V_dr. The oscillator 120-1 generates the voltage control signal V_ctrl, which cyclically transitions to the voltage levels of the dropped voltage V_L, and the ground voltage VSS when the detection signal Det is enabled and the dropped voltage V_L is outputted as the driving voltage V_dr. When the detection signal Det is disabled, the oscillator 120-1 maintains the voltage control signal V_ctrl at the voltage level of the ground terminal VSS regardless of the voltage level of the driving voltage V_dr. The voltage level of the external voltage VDD is higher than the voltage level of the dropped voltage V_L.

The pumping unit 130-1 generates the pumping voltage VPP in response to the voltage control signal V_ctrl. For example, in the pumping unit 130-1, the voltage level of the pumping voltage VPP increases when the voltage control signal V_ctrl cyclically transitions. The voltage level increment of the pumping voltage VPP is determined according to the voltage level of the voltage control signal V_ctrl, which cyclically transitions. In other words, in the pumping unit 130-1, the voltage level of the pumping voltage VPP increases more quickly when the external voltage VDD is outputted as the driving voltage V_dr than when the dropped voltage V_L is outputted as the driving voltage V_dr.

The driving voltage providing unit 140-1 determines the voltage level of the driving voltage V_dr in response to the voltage generation enable signal S_vgen and the detection signal Det. For example, the driving voltage providing unit 140-1 outputs the dropped voltage V_L as the driving voltage V_dr when the detection signal Det and the voltage generation enable signal S_vgen are simultaneously enabled. The driving voltage providing unit 140-1 outputs the dropped voltage V_L as the driving voltage V_dr until the detection signal Det becomes disabled. The driving voltage providing unit 140-1 outputs the external voltage VDD as the driving voltage V_dr when the detection signal Det is disabled.

The dropped voltage V_L is outputted as the driving voltage V_dr during the period in which the voltage generation enable signal S_vgen is enabled and the detection signal Det is enabled for the first time, and the external voltage VDD is outputted as the driving voltage V_dr during the enable period of the detection signal Det after the detection signal Det is disabled, that is, from when the detection signal Det is enabled for the second time.

Figure 8:
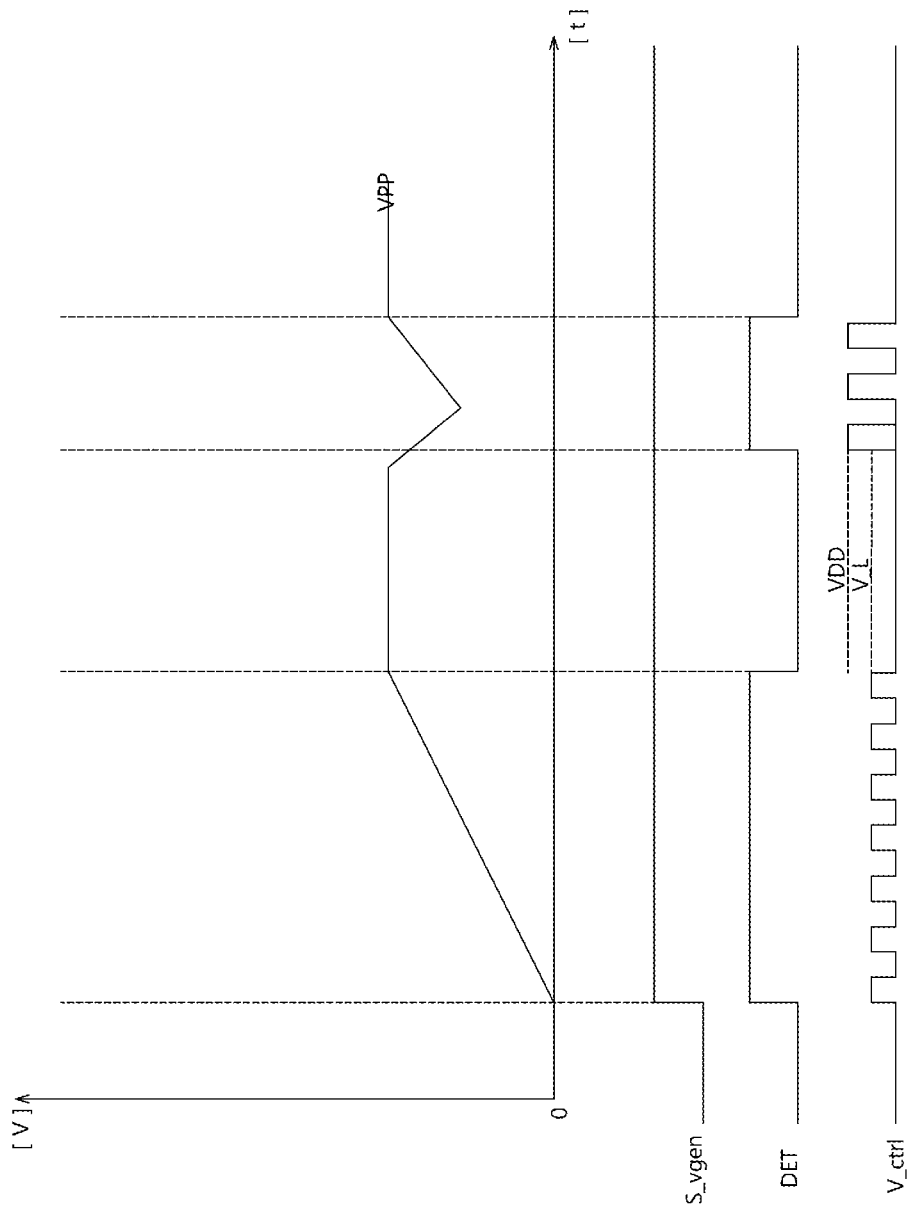
FIG. 8 is a graph provided to assist in explaining an operation of the voltage generation circuit in accordance with an embodiment.

As shown in FIG. 8, in the voltage generation circuit 100-1 in accordance with an embodiment, if the voltage generation enable signal S_vgen is enabled and the voltage generation circuit 100-1 is activated, the voltage control signal V_ctrl, which cyclically transitions to the voltage levels of the dropped voltage V_L and the ground voltage VSS, is generated during the first enable period of the detection signal Det and allows the voltage level of the pumping voltage VPP to increase. Thereafter, the voltage control signal V_ctrl which cyclically transitions to the voltage levels of the external voltage VDD and the ground voltage VSS is generated from the second enable period of the detection signal Det and allows the voltage level of the pumping voltage VPP to increase.

As a consequence, in the voltage generation circuit 100-1 in accordance with an embodiment, the voltage level increment of the pumping voltage VPP during the period when the detection signal Det is enabled for the first time is a situation where the voltage generation enable signal S_vgen is enabled is smaller than the voltage level increment of the internal voltage V_int from when the detection signal Det is enabled for the second time.

While various embodiments have been described above, it will be understood to those skilled in the art that the embodiments described are examples only. Accordingly, the voltage generation circuit described herein should not be limited based on the described embodiments.

What is claimed is:

1. A voltage generation circuit comprising:
    a voltage detection unit configured to detect a voltage level of an internal voltage and generate a detection signal;
    a first voltage control unit configured to be applied with a driving voltage and generate a voltage control signal in response to the detection signal;
    a voltage generation unit configured to generate the internal voltage in response to the voltage control signal; and
    a second voltage control unit configured to change a voltage level of the driving voltage in response to a voltage generation enable signal and the detection signal,
    wherein the voltage generation unit allows the voltage level of the internal voltage to increase when the voltage control signal is enabled, and determines a voltage level increment of the internal voltage according to a voltage level of the enabled voltage control signal.

2. The voltage generation circuit according to claim 1, wherein the first voltage control unit allows the voltage control signal to transition to the voltage level of the driving voltage when the detection signal is enabled.

3. The voltage generation circuit according to claim 1, wherein the second voltage control unit generates the driving voltage having a lower voltage level when the voltage generation enable signal and the detection signal are simultaneously enabled than the driving voltage generated after the detection signal is disabled.

4. The voltage generation circuit according to claim 3, wherein the second voltage control unit comprises:
    a voltage dropping section configured to allow a first voltage to decrease and generate a second voltage;
    a driving voltage selection section configured to generate a voltage select signal in response to the voltage generation enable signal and the detection signal; and
    a driving voltage output section configured to output one of the first voltage and the second voltage as the driving voltage in response to the voltage select signal.

5. The voltage generation circuit according to claim 4, wherein the driving voltage selection section enables the voltage select signal when the voltage generation enable signal and the detection signal are simultaneously enabled, and disables the voltage select signal after the detection signal is disabled.

6. The voltage generation circuit according to claim 5, wherein the driving voltage output section outputs the second voltage as the driving voltage when the voltage select signal is enabled, and outputs the first voltage as the driving voltage when the voltage select signal is disabled.

7. A voltage generation circuit suitable for maintaining a voltage level of an internal voltage at a predetermined voltage level when a voltage generation enable signal is enabled, comprising:
    a voltage detection unit configured to enable a detection signal when the voltage level of the internal voltage is lower than the predetermined voltage level;
    a first voltage control unit configured to enable a voltage control signal so that it has a voltage level of a driving voltage in response to an enabled detection signal;
    a voltage generation unit configured to determine an increment of the internal voltage according to a voltage level of the enabled voltage control signal, and allow the voltage level of the internal voltage to increase; and
    a second voltage control unit configured to generate the driving voltage having a lower voltage level during a period in which the voltage generation enable signal is enabled and the detection signal is enabled for the first time than the driving voltage generated after the detection signal enabled for the first time becomes disabled.

8. The voltage generation circuit according to claim 7, wherein the second voltage control unit comprises:
    a voltage dropping section configured to allow a first voltage to decrease and generate a second voltage;
    a driving voltage selection section configured to generate a voltage select signal in response to the voltage generation enable signal and the detection signal; and
    a driving voltage output section configured to output one of the first voltage and the second voltage as the driving voltage in response to the voltage select signal.

9. The voltage generation circuit according to claim 8, wherein the driving voltage selection section generates the voltage select signal such that the second voltage is outputted as the driving voltage during the period in which the voltage generation enable signal is enabled and the detection signal is enabled for the first time, and generates the voltage select signal such that the first voltage is outputted as the driving voltage after the detection signal enabled for the first time becomes disabled.

10. A voltage generation circuit comprising:
    a pumping voltage detection unit configured to detect a voltage level of a pumping voltage and generate a detection signal;
    an oscillator configured to generate a voltage control signal cyclically transitioning to a voltage level of a driving voltage in response to the detection signal;
    a pumping unit configured to generate the pumping voltage in response to the cyclically-transitioning voltage control signal; and
    a driving voltage providing unit configured to change the voltage level of the driving voltage in response to a voltage generation enable signal and the detection signal,
    wherein the driving voltage providing unit generates the driving voltage having a lower voltage level when the voltage generation enable signal and the detection signal are simultaneously enabled than the driving voltage generated after the detection signal is disabled.

11. The voltage generation circuit according to claim 10, wherein the oscillator generates the voltage control signal cyclically transitioning to the voltage level of the driving voltage and a voltage level of a ground voltage, when the detection signal is enabled.

12. The voltage generation circuit according to claim 11, wherein:
    the oscillator comprises a plurality of inverters coupled in a ring structure; and the plurality of respective inverters operate by being applied with the driving voltage and the ground voltage.

13. The voltage generation circuit according to claim 10, wherein the pumping unit allows the voltage level of the pumping voltage to increase when the voltage control signal cyclically transitions, and determines a voltage level increment of the pumping voltage according to a voltage level of the cyclically-transitioning voltage control signal.

14. The voltage generation circuit according to claim 10, wherein the driving voltage providing unit comprises:
a voltage dropping section configured to allow an external voltage to decrease and generate a dropped voltage;
a driving voltage selection section configured to enable a voltage select signal when the voltage generation enable signal and the detection signal are simultaneously enabled, and disable the voltage select signal after the detection signal is disabled; and
a driving voltage output section configured to output the dropped voltage as the driving voltage when the voltage select signal is enabled, and output the external voltage as the driving voltage when the voltage select signal is disabled.

15. A voltage generation circuit suitable for maintaining a voltage level of a pumping voltage at a predetermined voltage level when a voltage generation enable signal is enabled, comprising:
a pumping voltage detection unit configured to enable a detection signal when the voltage level of the pumping voltage is lower than the predetermined voltage level;
an oscillator configured to generate a voltage control signal cyclically transitioning to a voltage level of a driving voltage, when the detection signal is enabled;
a pumping unit configured to determine a voltage level increment of the pumping voltage according to the voltage level of the driving voltage, and allow the voltage level of the pumping voltage; and
a driving voltage providing unit configured to generate the driving voltage having a lower voltage level during a period in which the voltage generation enable signal is enabled and the detection signal is enabled for the first time than the driving voltage generated after the detection signal enabled for the first time becomes disabled.

16. The voltage generation circuit according to claim 15, wherein the driving voltage providing unit comprises:
a voltage dropping section configured to allow an external voltage to decrease and generate a dropped voltage;
a driving voltage selection section configured to generate a voltage select signal in response to the voltage generation enable signal and the detection signal; and
a driving voltage output section configured to output one of the external voltage and the dropped voltage as the driving voltage in response to the voltage select signal.

17. The voltage generation circuit according to claim 16, wherein the driving voltage selection section generates the voltage select signal such that the dropped voltage is outputted as the driving voltage during the period in which the voltage generation enable signal is enabled and the detection signal is enabled for the first time, and generates the voltage select signal such that the external voltage is outputted as the driving voltage after the detection signal enabled for the first time becomes disabled.

* * * * *